June 17, 1952   C. H. HOLSCLAW   2,600,406
MEANS FOR SUSPENDING BOATS FROM TRAILERS
Filed Sept. 16, 1948   3 Sheets-Sheet 1
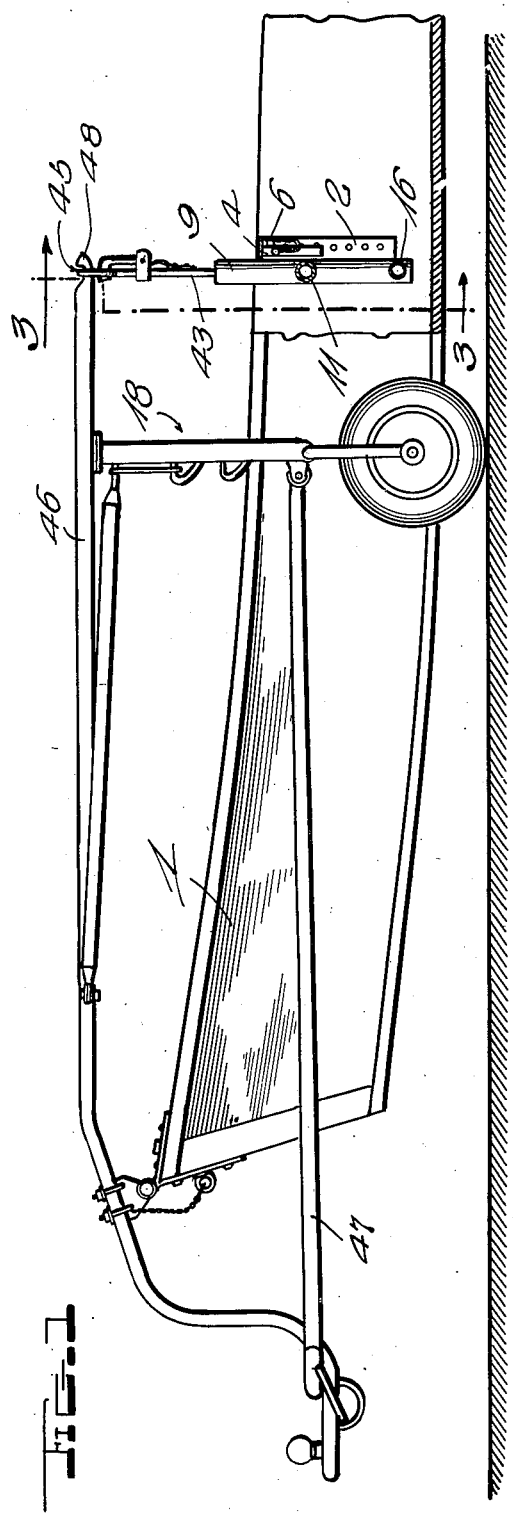
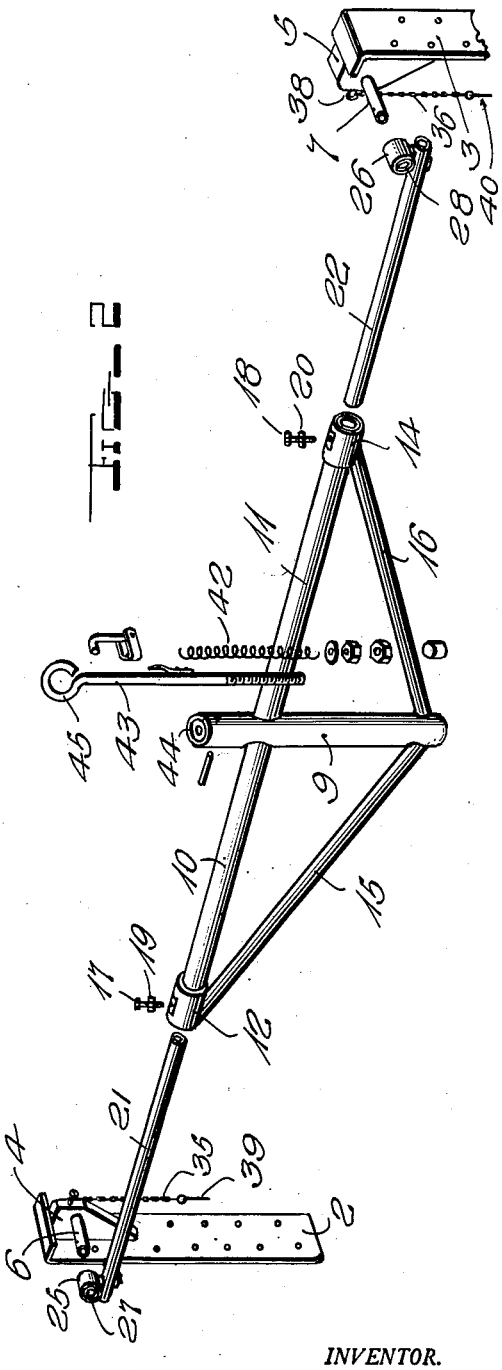
INVENTOR.
Charles H. Holsclaw,
BY
John C. Brady
ATTORNEY June 17, 1952 — C. H. HOLSCLAW — 2,600,406
MEANS FOR SUSPENDING BOATS FROM TRAILERS
Filed Sept. 16, 1948 — 3 Sheets-Sheet 2
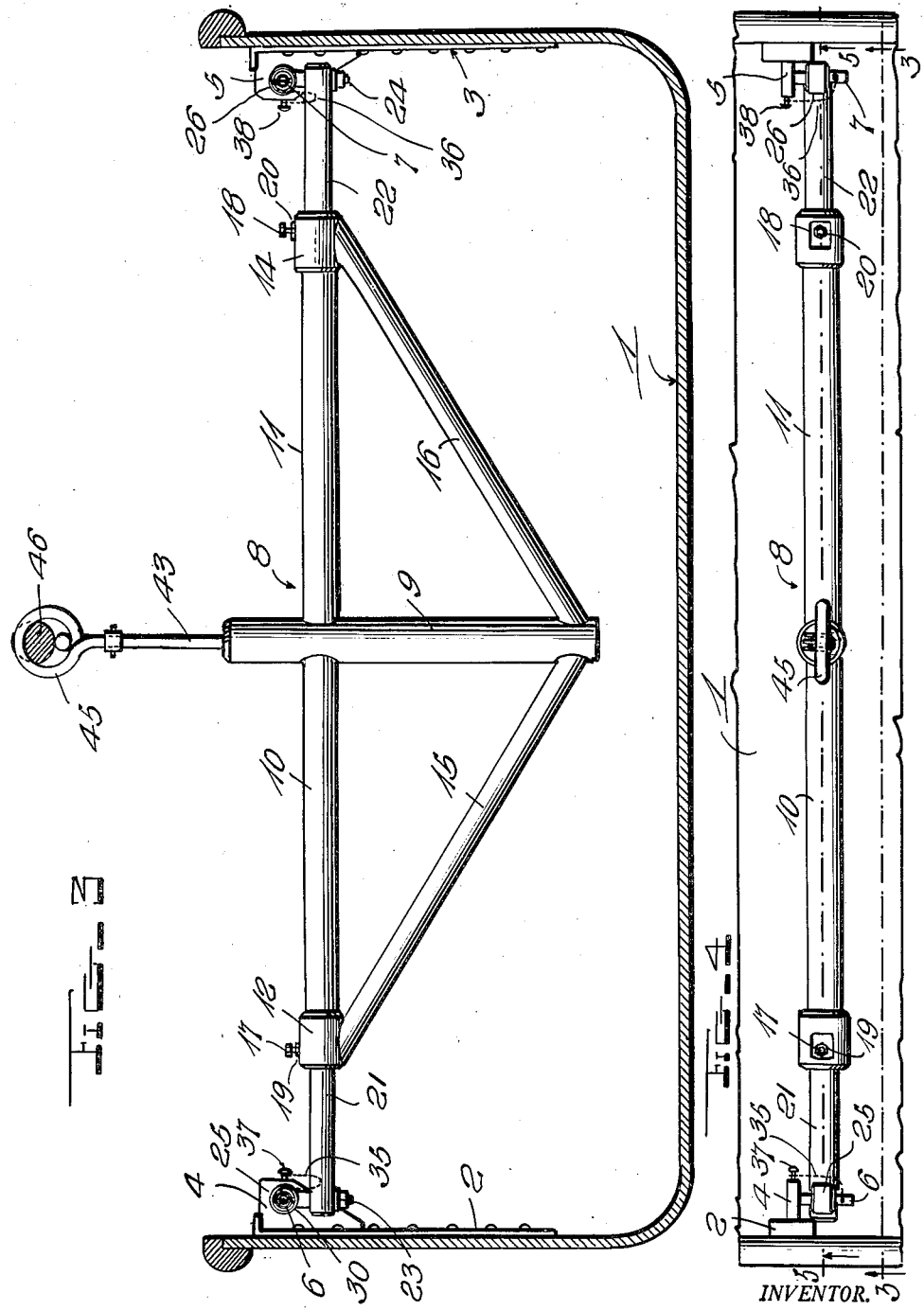
INVENTOR.
Charles H. Holsclaw,
BY John B. Brady
ATTORNEY

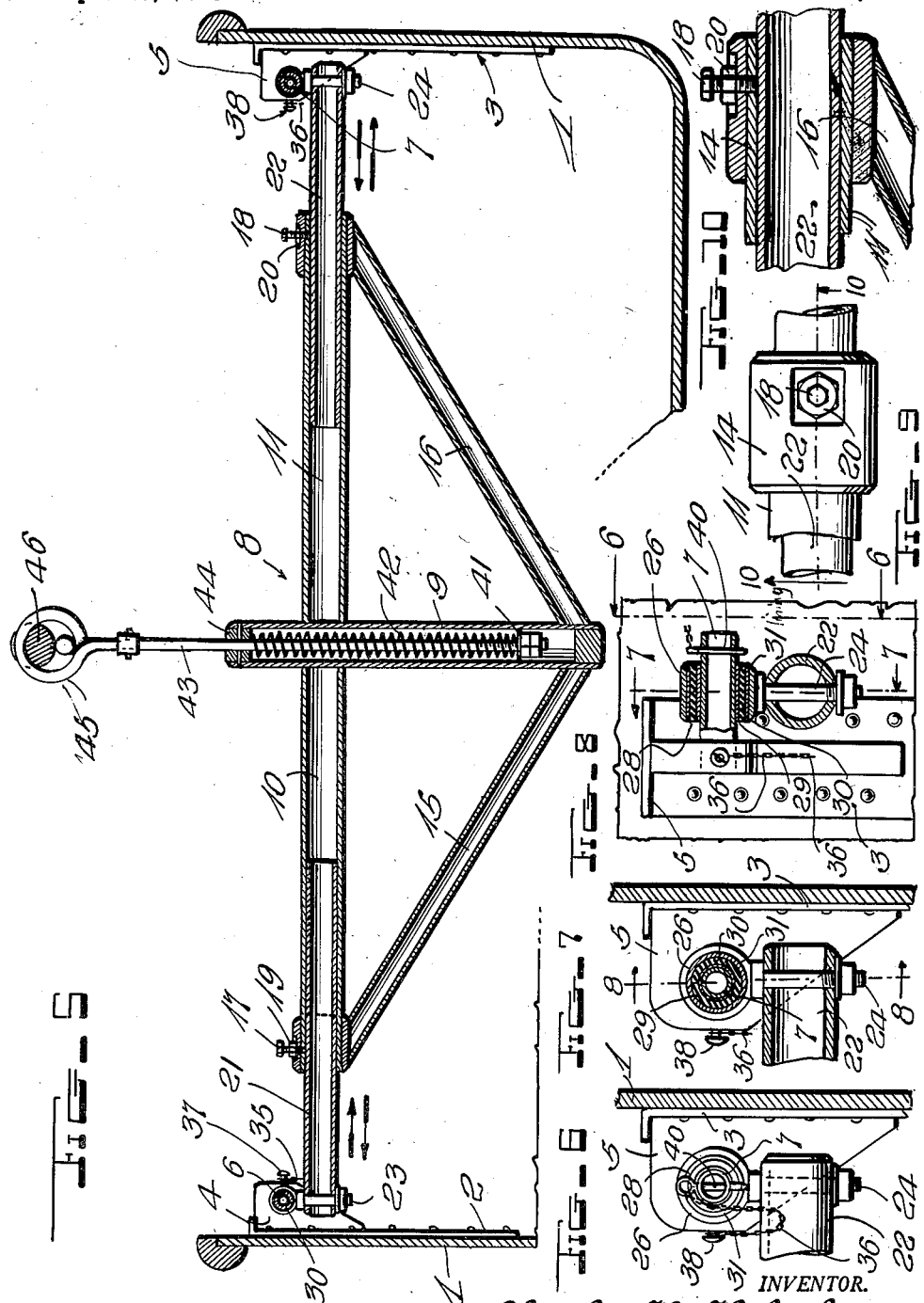

Patented June 17, 1952

2,600,406

UNITED STATES PATENT OFFICE 2,600,406

MEANS FOR SUSPENDING BOATS FROM TRAILERS

Charles H. Holsclaw, Evansville, Ind.

Application September 16, 1948, Serial No. 49,526

5 Claims. (Cl. 9—1)

My invention relates broadly to means for suspending boats from trailers, and more particularly to an improved gunwale suspension unit for pendently suspending a boat from a trailer.

One of the objects of my invention is to provide an improved shock protected mounting assembly for a gunwale suspension unit for boats.

Another object of my invention is to provide a gunwale suspension unit for boats formed entirely from tubular members telescopically arranged and adjustable to various widths and styles of boats.

A still further object of my invention is to provide an arrangement of hardware for permanent assembly interiorly of the sides of the boat and adjustably engageable by tubular members extending from a pendent suspension unit for resiliently suspending a boat from a trailer.

Still another object of my invention is to provide a gunwale unit for suspending a boat from a trailer in which the gunwale unit is constructed from tubular members shaped to provide very substantial structural rigidity and strength for suspending the mass of a boat while maintaining the weight of the unit at a minimum.

Other and further objects of my invention reside in an improved lightweight shock mount gunwale suspension unit for boats as set forth more fully in the specification hereinafter following by reference to the accompanying drawings, in which:

Figure 1 is a side elevational view of the trailer showing the means for suspending a boat therefrom in accordance with my invention; Fig. 2 is a perspective view of the improved gunwale suspension unit embodying my invention; Fig. 3 is a transverse vertical sectional view taken substantially on line 3—3 of Fig. 1; Fig. 4 is a fragmentary plan view of the gunwale suspension unit embodying my invention; Fig. 5 is a vertical sectional view taken substantially on line 5—5 of Fig. 4; Fig. 6 is a fragmentary elevational view of one end of the gunwale suspension unit showing the shockproof mounting interposed between the suspension unit and the gunwale of the boat, the view being taken substantially on line 6—6 of Fig. 8; Fig. 7 is a fragmentary transverse sectional view through one end of the gunwale suspension unit and the shockproof mounting means interposed between the gunwale of the boat and the suspension unit therefor, the view being taken substantially on line 7—7 of Fig. 8; Fig. 8 is a vertical sectional view taken substantially on line 8—8 of Fig. 7 and showing the bracket which attaches to the gunwale of the boat in elevation; Fig. 9 is a fragmentary plan view illustrating the adjustment means for selectively fixing the width of the gunwale suspension unit with respect to the interior of the boat; and Fig. 10 is a fragmentary longitudinal sectional view through the adjustment means associated with the suspension unit, the view being taken substantially on line 10—10 of Fig. 9.

My invention is directed to an improved lightweight rigid gunwale suspension unit formed from tubular members of a cross section and of a structural assembly which ensures rigidity and yet maintains the weight of the unit at a minimum. The suspension unit of my invention is employed for the pendent mounting of boats from the frame of a trailer which may be attached to the rear of an automobile for transportation over a highway to a shore, and used to facilitate launching and retrieving of the boat. It is important that the suspension unit be light in weight and include means for absorbing shock which may be encountered in driving over a highway for thus protecting the boat from injury due to shocks and jolts during transportation. The gunwale suspension unit of my invention has been developed for the purpose of shock mounting a boat at the gunwales and also along the central suspension axis of the boat. I provide brackets which are permanently secured to transversely opposite sides of the interior of the boat and operative to coact with shock mounts carried by the opposite ends of the gunwale suspension unit. The gunwale suspension unit of my invention is formed by adjustable tubular members which may be adjusted transversely to permit an increase or decrease in the effective width thereof for mounting boats of different sizes and styles. The suspension unit terminates in a centrally arranged vertically extending cylinder. This cylinder encases a spring mounted eyelet device. The eyelet device is engageable by the centrally disposed drawbar of the tubular frame for pendently suspending the boat from the trailer frame.

Referring to the drawings in more detail, reference character 1 designates a boat fitted for suspension from a trailer frame. The boat is provided with a pair of permanently attached brackets fitted to the interior of the sides of the boat 1, as represented at 2 and 3. Each bracket 2 and 3 includes an angularly directed plate portion 4 and 5. Each plate portion 4 and 5 forms a mounting means for a pin shown at 6 and 7 extending substantially parallel to the sides of the brackets 2 and 3 and substantially parallel to the sides of the boat 1. The pins 6 and 7 form attachment means to which the transversely extending suspension unit 8 connects.

The suspension unit 8 comprises a vertically extending cylindrical member 9 from which tubular members 10 and 11 extend in opposite directions and terminate in sleeves 12 and 14. The sleeves 12 and 14 form connecting means for the tubular brace members 15 and 16 which extend from the sleeves 12 and 14 respectively to a position adjacent the base of the cylinder 9.

Each of the sleeves 12 and 14 contain screw threaded setscrews extending therethrough at 17 and 18 with locknuts 19 and 20 thereon, enabling the telescopically arranged slidable tubular members 21 and 22 to be set in any selected position with respect thereto. The tubular members 21 and 22 are of smaller cross section than the internal diameter of tubular members 10 and 11 so that tubular members 21 and 22 may slide into or may be projected from the ends of tubular members 10 and 11.

The outwardly extending ends of tubular members 21 and 22 each include a vertically extending bolt member 23 and 24 as shown. Each bolt member terminates in a sleeve-like cylindrical head, shown at 25 and 26. The sleeve-like cylindrical head on each bolt member serves as a housing which receives the cylindrical shock mount shown at 27 and 28. Each shock mount includes an interior tubular sleeve 29, a cylindrical cushion of live rubber 30, and an external tubular metallic lining 31. The external metallic lining 31 fits within the sleeve-like cylindrical head 25. The axis of the sleeve 29 extends in a direction substantially normal to the plane of the transverse suspension unit formed by tubular members 10 and 11, 21 and 22. The construction of the shock mounts which fit within the cylindrical sleeve-like heads 25 and 26 of bolts 23 and 24 are symmetrical and identical. That is to say, in each mount an internal sleeve is cushioned by a cylindrical sleeve of live rubber which is housed within the external cylindrical sleeve which fits within the sleeve-like head 25 or 26 of bolts 23 or 24. The axes of the shock mounts at both ends of the transverse frame are substantially parallel with respect to each other. Thus, the internal sleeve 29 in the shock mount carried by bolt 23 may be slipped over the end of pin 6. The internal sleeve 32 of the shock mount carried by bolt 24 may be slipped over the end of pin 7. The suspension is now complete, and as a protection against the shock mounts being dislodged from the pins 6 and 7, I provide safety chains 35 and 36 which connect between the brackets 4 and 5 where they are permanently attached, as represented at 37 and 38 at one end, and provided with pins 39 and 40 at their opposite ends. Pins 39 and 40 may be passed through apertures adjacent the ends of pins 6 and 7 for maintaining the protective chains around the sleeve-like heads 25 and 26, of bolts 23 and 24, thereby preventing dislodgment of the suspension unit from the boat.

The central cylinder 9 includes the piston device 41 slidably operative therein against the action of the expansion coil spring 42. The suspension rod 43 which passes through the header 44 in the end of cylinder 9 connects with piston device 41 at one end and terminates in the eyelet head 45 at its opposite end. The drawbar of the trailer shown at 46 is engaged through the eyelet 45.

The boat 1, when centered beneath the trailer frame indicated at 47, is suspended by adjusting the transverse gunwale suspension unit to the required size by loosening setscrews 17 and 18 and moving tubular members 21 and 22 outwardly to a position in which the internal sleeves 29 and 32 of the shock mounts may be slipped over the ends of the pins 6 and 7 projecting from brackets 4 and 5 permanently attached to the interior side walls of the boat. Setscrews 17 and 18 are then tightened. The trailer is then maneuvered to inject the hooked end 48 of drawbar 46 through the eyelet 45 of suspension rod 43. The frame of the trailer 47 may now be coupled to an automobile for transportation, with the boat resiliently supported in 2-fold manner, i. e., through the central coil spring 42 and through the gunwale sleeve-like cushion mounts 30 and 33. The coaction of the cushion mounts both at the gunwales of the boat and the coil spring at the center of the boat, ensures the absorption of shock under all normal conditions of transportation encountered in transporting the boat. The fact that the telescopically arranged slidable tubular members 21 and 22 are adjustable within tubular members 10 and 11 enable the suspension means to be applied to boats of different beams.

I have found the suspension unit of my invention highly practical and successful in its operation, and while I have described my invention in certain of its preferred embodiments I realize that modifications in detail may be made, and I desire it to be understood that no limitations upon my invention are intended other than may be imposed by the scope of the appended claims.

What I claim as new and desire to secure by Letters Patent of the United States is as follows:

1. Means for suspending a boat from a trailer comprising in combination with a trailer frame, a boat, bracket members secured to the opposite interior gunwales of the boat, plate members directed in a plane interiorly toward each other from said bracket members, a pin member carried by each of said plates and extending in an axis substantially parallel with the interior gunwale of the boat, a suspension frame extending transversely of the boat, a shockproof support carried by each end of said frame, each shockproof support being slidably engageable over the pin adjacent each interior gunwale of the boat for providing a shockproof mount for the boat, and a central pendant support disposed in a vertical position midway of said suspension frame and extending between said suspension frame and the trailer frame.

2. Means for suspending a boat from a trailer comprising a tubular frame including a vertically disposed central cylinder, a spring actuated suspension rod operative in said central cylinder, a pair of transversely extending tubular members secured to opposite sides of said central cylinder, diagonally disposed bracing members secured adjacent the base of said central cylinder and supporting the opposite outstanding ends of said tubular members, a telescopic slidable tube disposed in each end of said tubular members, setscrews extending through the opposite ends of said tubular members and engaging said telescopic slidable tubes for fixing said tubes in predetermined positions, a boat having brackets mounted on the interior gunwales thereof, means coupling the opposite ends of said telescopic tubes with said brackets, and a centrally positioned hook interconnecting said suspension rod in a position midway of said transversely extending tubular members with a trailer for suspending the boat.

3. Means for suspending a boat from a trailer as set forth in claim 2 in which the coupling means between the ends of said slidable tubes and said brackets are constituted by shock absorbing tubular members carried by the ends of said slidable tubes and extending on axes normal to the axes of said slidable tubes and engaging pins carried by said brackets and extending substantially parallel with the interior of the gunwales of the boat.

4. Means for suspending a boat from a trailer as set forth in claim 2 in which a detachable chain and pin is connected between said brackets and the ends of said slidable tubes for maintaining said coupling means between the ends of said slidable tubes and said brackets while said suspension unit is in use.

5. A suspension unit for suspending a boat from a trailer comprising bracket members secured to the interior gunwales of a boat, plate members secured to said bracket members and extending in substantially the same plane inwardly toward each other, a pin carried by each plate member and extending substantially parallel to the interior side wall of the boat, a transverse frame having a central vertically disposed pendent support and terminating in opposite telescopically adjustable slidable members and insertable interiorly between said brackets within the boat, resilient coupling means carried by the ends of said telescopically adjustable slidable members and engageable over the pins on said brackets, and a chain connected with each of said plates and terminating in a pin insertable through the end of the associated pin for confining the coupling means on said pin and maintaining the suspension unit in a central position between the gunwales of the boat.

CHARLES H. HOLSCLAW.

REFERENCES CITED

The following references are of record in the file of this patent:

UNITED STATES PATENTS

| Number | Name | Date |
| --- | --- | --- |
| 1,939,863 | Seiter | Dec. 19, 1933 |
| 2,044,392 | Lord | June 16, 1936 |
| 2,450,279 | Guy | Sept. 28, 1948 |
| 2,451,236 | Oeth | Oct. 12, 1948 |
| 2,525,715 | Oeth | Oct. 10, 1950 |
| 2,529,849 | Oeth | Nov. 14, 1950 |